(12) United States Patent
Chen

(10) Patent No.: US 11,974,076 B2
(45) Date of Patent: Apr. 30, 2024

(54) SECURITY SYSTEM

(71) Applicant: Climax Technology Co., Ltd., Taipei (TW)

(72) Inventor: Yi-Kai Chen, Taipei (TW)

(73) Assignee: Climax Technology Co., Ltd., Taipei (TW)

( * ) Notice: Subject to any disclaimer, the term of this patent is extended or adjusted under 35 U.S.C. 154(b) by 175 days.

(21) Appl. No.: 17/567,720

(22) Filed: Jan. 3, 2022

(65) Prior Publication Data

US 2023/0216992 A1  Jul. 6, 2023

(51) Int. Cl.
*H04N 7/18* (2006.01)
*G06V 20/52* (2022.01)
*G08B 17/10* (2006.01)
*H04N 7/01* (2006.01)

(52) U.S. Cl.
CPC ............. *H04N 7/183* (2013.01); *G06V 20/52* (2022.01); *G08B 17/10* (2013.01); *H04N 7/0117* (2013.01); *H04N 7/188* (2013.01)

(58) Field of Classification Search
CPC ...... H04N 7/183; H04N 7/0117; H04N 7/188; G06V 20/52; G08B 17/10
See application file for complete search history.

(56) References Cited

U.S. PATENT DOCUMENTS

| | | | | |
|---|---|---|---|---|
| 8,565,228 B1* | 10/2013 | Howard | ................ | H04L 12/283 370/389 |
| 9,818,277 B1* | 11/2017 | Solh | ........................ | G06V 20/40 |
| 10,750,133 B2* | 8/2020 | Cui | ........................... | H04N 7/18 |
| 10,853,949 B2* | 12/2020 | Komiya | ................. | H04N 7/188 |
| 2007/0247302 A1* | 10/2007 | Martin | ................. | G08B 25/008 340/506 |
| 2016/0006988 A1* | 1/2016 | Zhao | ....................... | H04N 7/181 348/155 |
| 2019/0174045 A1* | 6/2019 | Liao | ........................ | H04N 23/74 |
| 2020/0013273 A1* | 1/2020 | Souloglou | ............... | G06F 16/56 |
| 2020/0043191 A1* | 2/2020 | Schoen | ................. | G06V 20/52 |
| 2021/0043069 A1* | 2/2021 | De Vries | ................ | H04N 7/183 |
| 2021/0303867 A1* | 9/2021 | Vaughan | ................ | G06V 10/82 |

FOREIGN PATENT DOCUMENTS

| | | |
|---|---|---|
| TW | 200740209 A | 10/2007 |
| TW | 201635248 A | 10/2016 |

OTHER PUBLICATIONS

Partial European Search Report dated Jun. 23, 2022 in related European Application No. 22150032.5.
Office Action dated Oct. 26, 2022 in corresponding Taiwan Patent Application No. 110148696.

* cited by examiner

*Primary Examiner* — Jared Walker
(74) *Attorney, Agent, or Firm* — Donald E. Stout; Stout, Uxa & Buyan, LLP

(57) ABSTRACT

A security system includes a surveillance device that monitors a predetermined event and captures images in a monitor scene; and a controller that controls the surveillance device and transmits the captured images. The surveillance device adjusts image capture amount, image transmit amount, image transmit order or image resolution when the predetermined event is detected and an object is detected on the captured images.

11 Claims, 2 Drawing Sheets

SECURITY SYSTEM

BACKGROUND OF THE INVENTION

1. Field of the Invention

The present invention generally relates to a security system, and more particularly to a surveillance device adaptable to the security system.

2. Description of Related Art

A smart home network or home automation system may connect a variety of home electronic systems such as lighting, temperature control, entertainment, security and alarm systems, and may be used to improve quality of life, increase personal productivity, enhance home security and promote convenience of entertainment.

A surveillance device in the smart home network may communicate with a central monitor station (CMS) or an end user via the Internet, thereby resulting in a security system. Images captured by the surveillance device of the smart home network may be transmitted to the CMS or the end user for visual verification.

However, as the data amount of images is generally large, it usually occupies considerable portion of transmission bandwidth and requires large response time and power consumption. The required transmission bandwidth, response time and power consumption can be reduced by transmitting fewer images, however, at the cost of sacrificing the accuracy of visual verification and increasing probability of false alarm.

A need has thus arisen to propose a novel scheme to improve transmission bandwidth, response time and power consumption in the security system.

SUMMARY OF THE INVENTION

In view of the foregoing, it is an object of the embodiment of the present invention to provide a security system and method capable of effectively reducing required transmission bandwidth, response time and power consumption by adopting edge computing.

According to one embodiment, a security system includes a surveillance device and a controller. The surveillance device monitors a predetermined event and captures images in a monitor scene. The controller controls the surveillance device and transmits the captured images. The surveillance device adjusts image capture amount, image transmit amount, image transmit order or image resolution when the predetermined event is detected and an object is detected on the captured images.

DETAILED DESCRIPTION OF THE INVENTION

Figure 1:
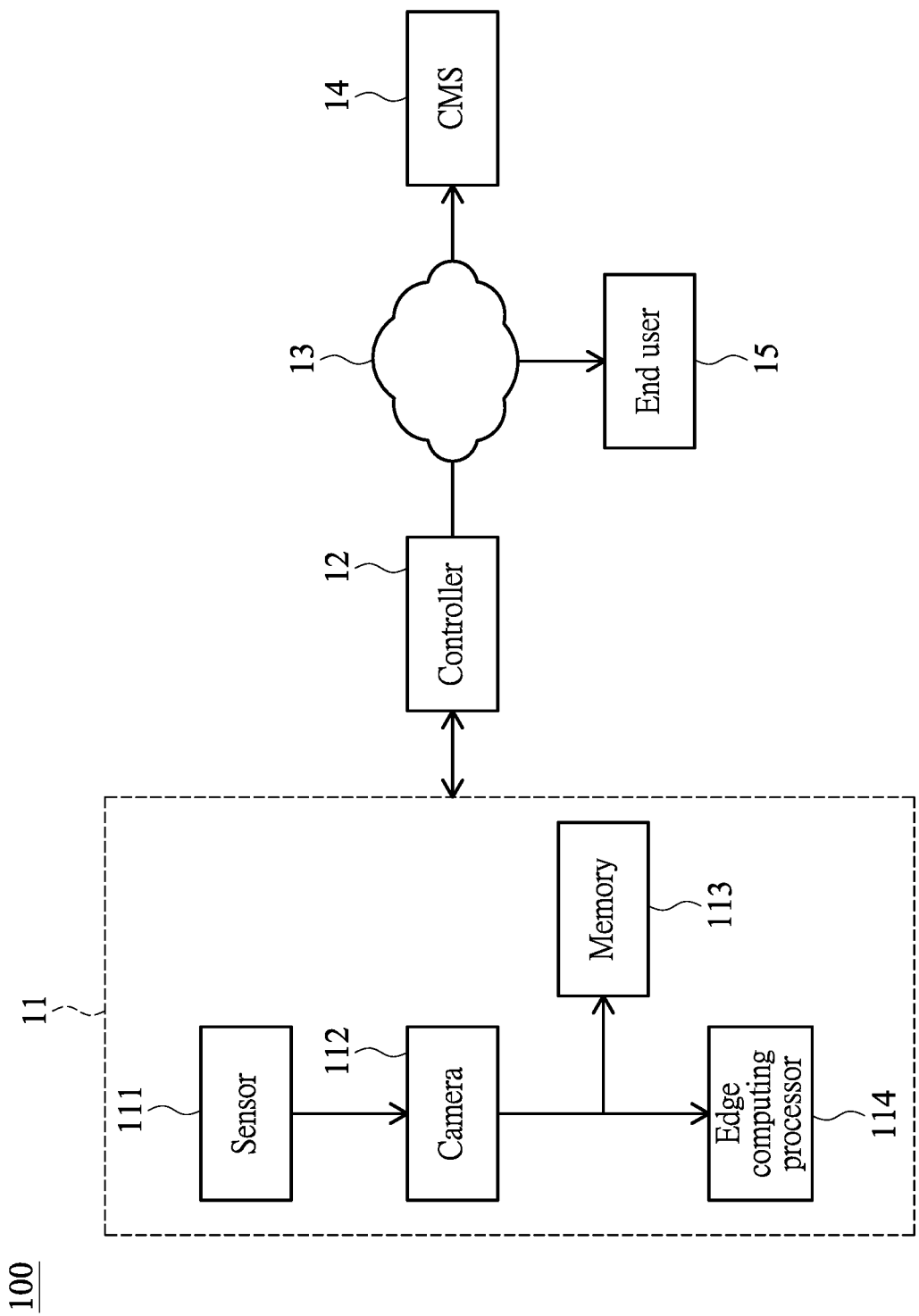
FIG. 1 shows a block diagram illustrating a security system according to one embodiment of the present invention.

FIG. 1 shows a block diagram illustrating a security system 100 adaptable to, but not limited to, a smart home network according to one embodiment of the present invention.

In the embodiment, the security system 100 may include a surveillance device 11 configured to monitor a predetermined event and to capture images in a monitor scene. In one embodiment, the predetermined event refers to occurrence of motion of an object (e.g., human or animal). In another embodiment, the predetermined event refers to occurrence of an object (e.g., smoke or flame).

The security system 100 may include a controller 12, such as a gateway, configured to control the surveillance device 11 and transmit the captured images to a central monitor station (CMS) 14 or an end user 15 for visual verification via a network 13 (e.g., the Internet). The communication between the controller 12 and the surveillance device 11 may adopt wireless standard such as sub-GHz RF, ZigBee, Bluetooth Low Energy (BLE), Z-Wave or Low Power Wi-Fi; or adopt wired standard such as RS-485.

The surveillance device 11 of the embodiment may include a sensor 111. In the embodiment, the sensor 111 may include a passive sensor. In one example, the sensor 111 may include a passive infrared (PIR) sensor, acting as a motion sensor, configured to detect motion of an object (e.g., human or animal) according to infrared emitted by the object. In another example, the sensor 111 may include a fire sensor, such as smoke sensor or heat sensor, configured to detect object (e.g., smoke or flame) associated with fire.

The surveillance device 11 of the embodiment may include a camera 112 configured to capture the images in the monitor scene, which is then transmitted to the CMS 14 or the end user 15. The surveillance device 11 may include a memory (device) 113 configured to temporality store the captured image.

According to one aspect of the embodiment, the surveillance device 11 may include an edge computing processor 114 configured to process the captured image (of the camera 112) to determine whether the image contains an object (e.g., human, animal, smoke or flame). In the computing field, the term edge computing refers to computation (and data storage) being closer to a source of data but away from a central processor. Take the security system 100 of the embodiment as an example, the edge computing processor 114 (and the memory 113) are closer to the camera 112 (i.e., the source of data) but away from the CMS 14 or the end user 15. Accordingly, required transmission bandwidth, response time and power consumption may be effectively reduced.

Figure 2:
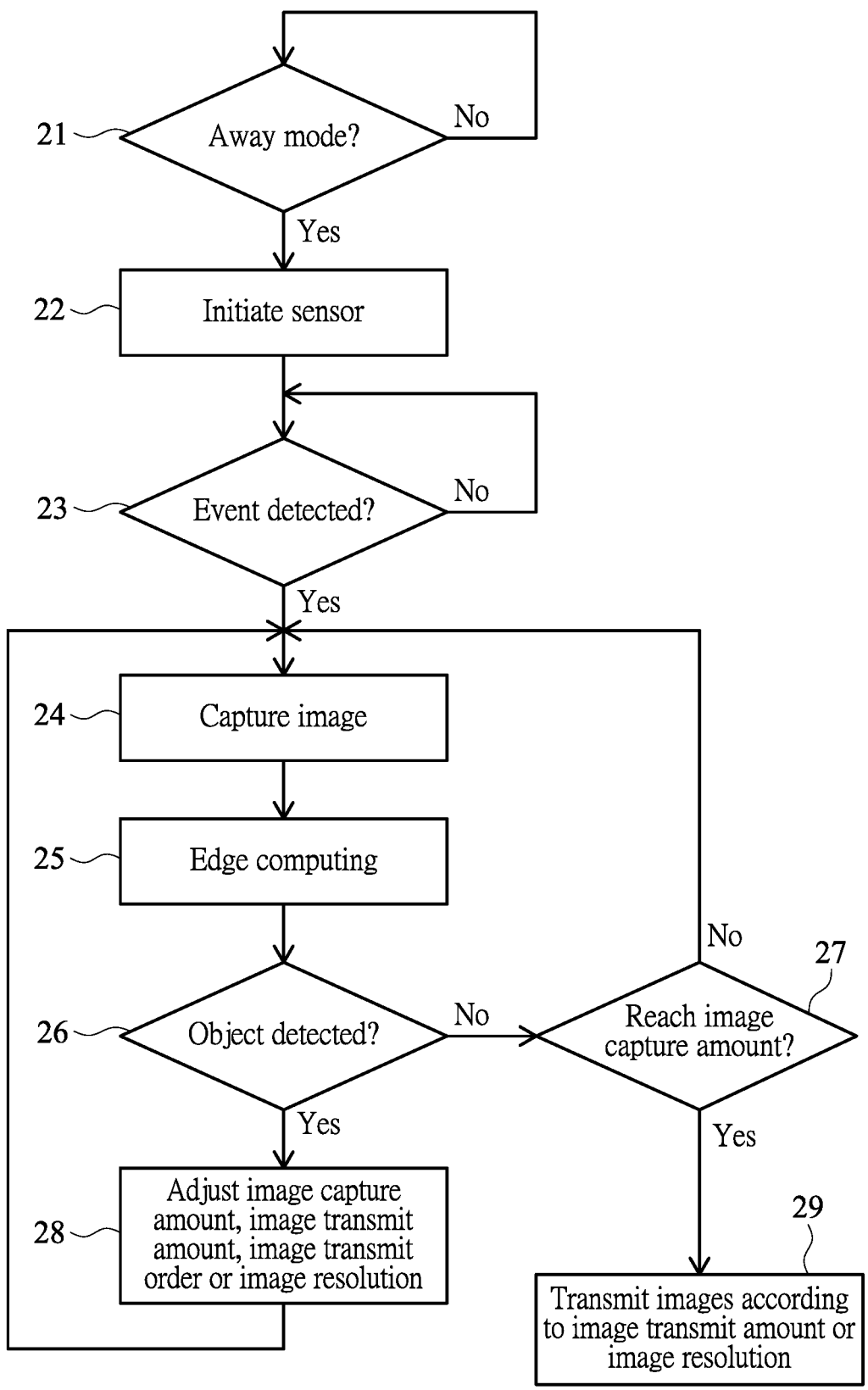
FIG. 2 shows a flow diagram illustrating a security method according to one embodiment of the present invention.

FIG. 2 shows a flow diagram illustrating a security method 200 operable in the security system 100 of FIG. 1 according to one embodiment of the present invention. In step 21, the controller 12 (e.g., a gateway) determines whether the smart home network is currently in away mode. If the smart home network is currently in away mode, indicating that a user is presently not at home, the flow goes to step 22, in which the controller 12 initiates the sensor 111. Next, in step 23, the sensor 111 determines whether a predetermined event is detected. In one embodiment, a passive infrared (PIR) sensor is used as the sensor 111 configured to detect motion of an object (e.g., human or animal). If the motion of the object is detected, the predetermined event is assumably detected. In another embodiment, a fire sensor (e.g., smoke sensor or heat sensor) is used as the sensor 111 configured to detect an object (e.g., smoke or flame). If the object is detected, the predetermined event is assumably detected.

If the predetermined event is detected (step 23), the sensor 111 activates the camera 112 to capture an image (step 24). Further, when the predetermined event is detected by the sensor 111, the surveillance device 11 notifies the controller 12, which then notifies the CMS 14 or the end user 15. After the camera 112 obtains captured images, which are then transmitted to the controller 12, the controller 12 subsequently transmits the captured images to the CMS 14 or the end user 15 for visual verification.

In step 25, the edge computing processor 114 receives the captured image (from the camera 112), on which edge computing (e.g., object detection) is performed to determine whether the image contains detected object (e.g., human, animal, smoke or flame) (step 26). Further, the image captured by the camera 112 may be temporarily stored in the memory 113.

If no object is detected on the image (step 26), the flow goes back to step 24 until image capture amount has been reached (step 27). If an object is detected on the image (step 26), the surveillance device 11 adjusts the image capture amount, image transmit amount, image transmit order or image resolution (step 28), and the flow goes back to step 24.

When the capture amount has been reached (step 27), the controller 12 transmits the captured images, via the network 13 (e.g., the Internet), to the CMS 14 or the end user 15 for visual verification according to the image transmit amount or the image resolution (step 29).

In one embodiment, the controller 12 transmits all captured images to the CMS 14 or the end user 15 according to the image transmit amount. In another embodiment, the controller 12 transmits only images with the detected object to the CMS 14 or the end user 15, thereby further reducing required transmission bandwidth, response time and power consumption.

In a further embodiment, if an object is detected on the image (step 26), the image transmit order is then adjusted (step 28) such that the images are transmitted in a particular order instead of being in chronological order. Specifically, in the embodiment, upon detecting the object on the image (step 26), the image containing the detected object is immediately transmitted, before other images are captured or transmitted, to the CMS 14 or the end user 15 for preliminary visual verification. Owing to the adjustment of the image transmit order, the efficiency of visual verification can be substantially enhanced.

In a further embodiment, the controller 12 transmits the captured images, via the network 13 (e.g., the Internet), to the CMS 14 or the end user 15 for visual verification according to the image resolution. In the embodiment, the controller 12 transmits images with detected object with a first (high) resolution image standard, and transmits images without detected object with a second (low) resolution image standard, where the second resolution is lower than the first resolution. For example, the first (high) resolution adopts Video Graphics Array (VGA) image standard, while the second (low) resolution adopts Quarter Video Graphics Array (QVGA) image standard. As QVGA is a quarter the resolution of VGA, more transmission bandwidth, response time and power consumption may be effectively reduced.

Although specific embodiments have been illustrated and described, it will be appreciated by those skilled in the art that various modifications may be made without departing from the scope of the present invention, which is intended to be limited solely by the appended claims.

What is claimed is:

1. A security system, comprising:
    a surveillance device that monitors a predetermined event and captures images in a monitor scene; and
    a controller that controls the surveillance device and transmits the captured images;
    wherein the surveillance device adjusts image capture amount, image transmit amount, image transmit order or image resolution when the predetermined event is detected and an object is detected on the captured images;
    wherein the surveillance device comprises:
        a sensor that detects the predetermined event;
        a camera that captures an image; and
        an edge computing processor that detects an object on only one image captured by the camera;
    wherein upon detecting the object by the edge computing processor, the image transmit order is adjusted and the controller accordingly transmits images containing the detected object to a central monitor station or an end user via a network before the controller transmits images not containing the detected object.

2. The system of claim 1, wherein the controller comprises a gateway.

3. The system of claim 1, wherein the surveillance device further comprises:
    a memory that temporarily stores the image captured by the camera.

4. The system of claim 1, wherein the sensor comprises a passive sensor.

5. The system of claim 4, wherein the passive sensor comprises a passive infrared sensor, and the predetermined event refers to occurrence of motion of the object.

6. The system of claim 4, wherein the passive sensor comprises a fire sensor, and the predetermined event refers to occurrence of the object associated with fire.

7. The system of claim 6, wherein the fire sensor comprises a smoke sensor and the predetermined event refers to occurrence of smoke, or comprises a heat sensor and the predetermined event refers to occurrence of flame.

8. The system of claim 1, wherein the controller initiates the sensor when away mode is determined.

9. The system of claim 1, wherein the sensor activates the camera to capture the images when the sensor detects the predetermined event.

10. The system of claim 9, wherein the controller transmits the captured images according to the image transmit amount when the edge computing processor detects the object on the captured images.

11. The system of claim 10, wherein the controller transmits images with detected object with first resolution, and transmits images without detected object with second resolution that is lower than the first resolution.

* * * * *